Aug. 26, 1958    S. L. KAUFMANN    2,849,159
SOLENOID-ACTUATED DISPENSER
Filed July 18, 1955

INVENTOR
STANLEY L. KAUFMANN.
BY
ATTORNEY

United States Patent Office 2,849,159
Patented Aug. 26, 1958

2,849,159

SOLENOID-ACTUATED DISPENSER

Stanley L. Kaufmann, East Meadow, N. Y., assignor to Marshfield Manufacturing Company, Long Island City, N. Y.

Application July 18, 1955, Serial No. 522,517

3 Claims. (Cl. 222—309)

This invention relates to a solenoid-actuated dispenser.

This dispenser is intended to be used for dispensing predetermined quantities or volumes of liquids, gases and powders and other flowable forms of material. One type of material to which this invention is particularly pertinent is a liquid detergent used in laundries and washing machines and like installations. This use, however, is purely illustrative of the invention and the invention is equally applicable to other materials such as the liquids used in the dry-cleaning industry, chemical compounds in various industries, liquid food products and components and other materials. For purposes of illustration, however, the device herein disclosed will be deemed to relate to the dispensing of liquid detergents.

The principal object of this invention is the provision of a dispenser of the character described which is adapted to dispense measured quantities of flowable material with rapid precision. Bearing in mind that the actuating means is a solenoid, it will be evident that the dispensing operation is a virtually instantaneous one and the time it takes for the solenoid core or plunger to move from unenergized to energized position is precisely the same time that the dispensing mechanism takes to dispense a measured quantity of material. This feature is very important in many applications and installations since it avoids interruptions which may cause delays in various processes and operations.

Another important object of this invention is the provision of a dispensing mechanism of the character described in which the dispensed material is ejected under relatively strong pressure. In effect, the dispenser may be classed as a force-feed mechanism for ejection and injection under such pressure as may be required. The nature of the solenoid will determine the force which is to be applied to the dispensing mechanism. The nature of the solenoid and the character of the dispensing mechanism are the two factors which will determine the dispensing force. Since variations may be had both in the solenoid and in the dispensing mechanism, the dispensing force may be varied and controlled in accordance with conventional engineering principles and practices.

Still another important object of this invention is the provision of a dispensing mechanism of the character described which may be quickly and easily adjusted to select or control the quantity or volume to be dispensed each time the solenoid is energized. This may be done by adjusting the length of the stroke or the distance traveled by the solenoid core or plunger. The quantity or volume dispensed would be proportional to the length of the stroke.

Briefly stated, the present invention comprises the use of a solenoid-actuated bellows to receive and eject measured quantities or volumes of a given material. The weight of the solenoid plunger acts upon the bellows to open the same and to draw a quantity of material from a reservoir. To assist in this process, there may be a gravity feed of the material from the reservoir and into the bellows. When the solenoid is energized, the solenoid plunger compresses the bellows and thereby ejects its contents. Two valves are provided, one between the reservoir and the bellows and the other between the bellows and the ejecting port or nozzle. The two valves function in opposite directions and only in response to opposite or opposing forces. Consequently, when the solenoid is de-energized and the bellows is pulled into open position, the valve between the reservoir and the bellows will open and the other valve will close. Conversely when the solenoid is energized and the bellows compressed to ejecting position, the valve between the bellows and the outlet port will open and the other valve will close.

In addition to a gravity action upon the bellows to open or expand the same, there is also a spring action. In one form of the invention, the spring is connected to the plunger of the solenoid. In another form of the invention, the spring is incorporated into the bellows itself. In either case, the spring tends to open the bellows in order to charge it and when the solenoid is energized to discharge the bellows, this is done against the action of the spring.

The bellows may be made of any suitable material. One material which has been found satisfactory for the purposes of this invention is polyethylene since it flexes freely and does not react chemically with the materials which have been dispensed by means of this dispenser, reference being here made especially to the detergents and other materials which are commonly used in the laundering and dry cleaning industries.

There are important advantages in the construction herein claimed. For example, the bellows prevents leakage such as would be encountered in plunger or piston-type dispensers. Furthermore, there is less friction in compressing the bellows than is encountered in actuating a plunger or piston. The bellows keeps its contents clean and free from contamination since its ability to prevent leakage also enables it to prevent contamination which is simply leakage in reverse.

The invention is illustrated in the accompanying drawing in which.

Figures 1, 2:
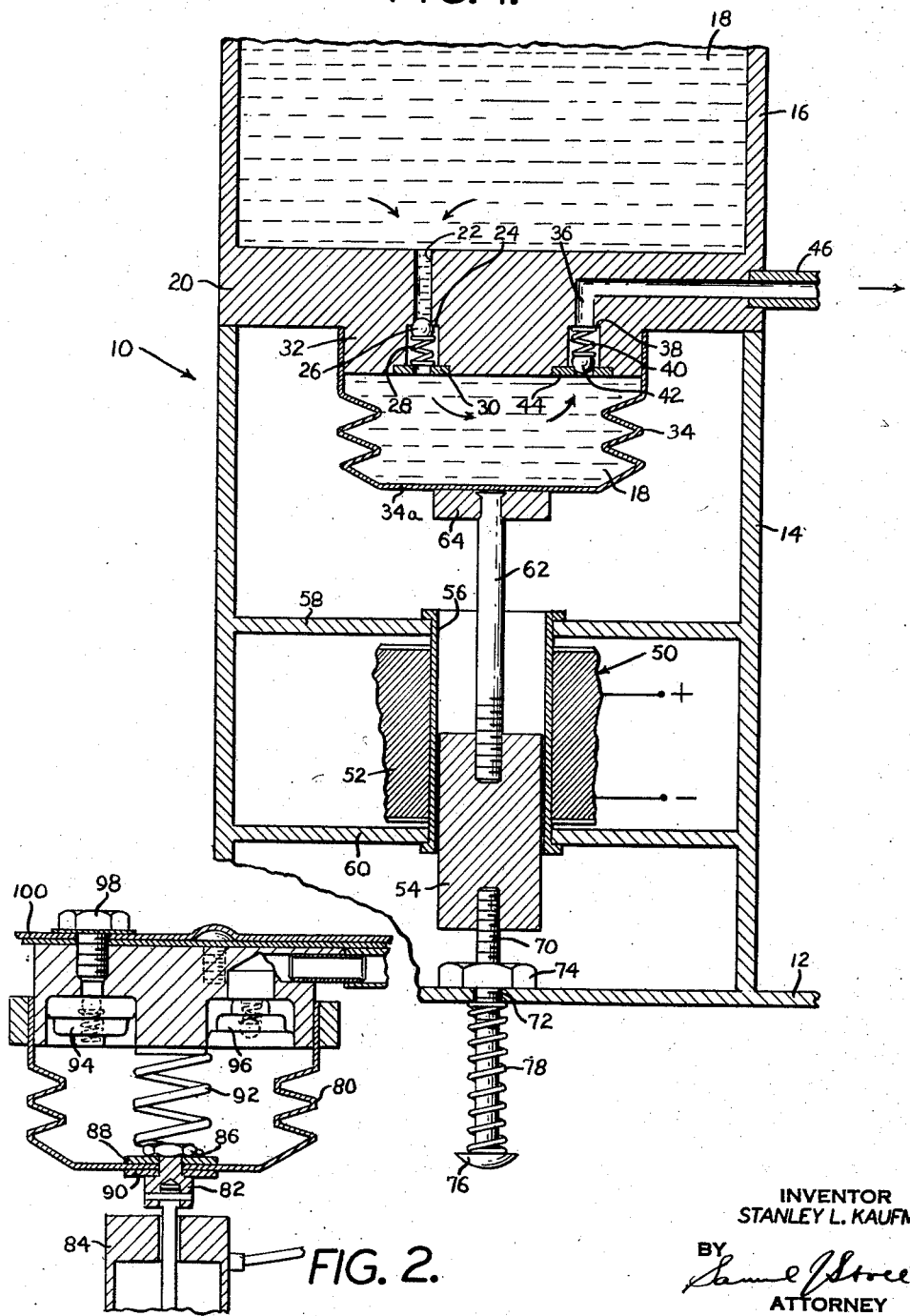
Fig. 1 is a longitudinal section through a dispenser made in accordance with one form of this invention.
Fig. 2 is a fragmentary sectional view through a modified construction.

The solenoid-actuated dispenser 10 shown in the drawing includes a base plate 12 or the like, a frame 14 or casing or the like mounted on said base and a tank or reservoir 16 mounted on said frame. A liquid detergent 18 may be introduced into said reservoir, or any other flowable material. Leading downwardly from the reservoir and extending through its bottom wall 20 is a passage 22 which serves as an outlet port for said reservoir and as an inlet port for the dispensing mechanism proper. As the drawing clearly shows, this passage 22 is a stepped hole with an annular shoulder 24 formed therein. This annular shoulder functions as a valve seat and it is engageable by a valve ball 26. Said valve ball is spring-urged by means of a coiled compression spring 28. A ring 30 supports the spring and enables it to urge the valve ball into engagement with the valve seat.

A cylindrical boss 32 is formed on wall 20 and as the drawing shows it projects downwardly therefrom. Encircling said boss and secured thereto by means of cement or other conventional means is the upper end of a flexible bellows 34. This bellows is closed on all sides but the top where it engages said boss 32. It will be observed that passage 22 provides communication between the reservoir 16 and said bellows 34. Still another passage 36 is provided in wall 20 and this passage functions as an outlet for the contents of the bellows. There is no communication between passage 36 and the reservoir except through said bellows. Passage 36, like passage 22, is a stepped passage and it is provided with an annular shoulder 38. A coiled compression spring 40 abuts said shoulder with its upper end and its lower end bears down upon a valve ball 42. This ball is supported by a ring 44 corresponding to ring 30 above mentioned. However, ring 44 serves as a valve seat for valve ball 42 and said valve ball is urged into engagement with said seat by said spring 40.

It will be noted that passage 36 is an L-shaped passage with one branch parallel to passage 22 and the other branch perpendicular thereto. This arrangement is not essential to the functioning of the mechanism but it shows one preferred design. Connected to said perpendicular portion of passage 36 is a tube 46 which may be connected to a nozzle or the like. It will now be understood that passage 36 and tube 46 comprise the conduits through which the contents of the bellows may be transferred to a suitable receptacle. When the bellows is opened to its Fig. 1 position, it tends to draw some of the material 18 out of reservoir 16 and through passage 22. This is done by suction and the valve ball 26 is unseated under the influence of such force to permit the flow of material. The same suction force urges ball 42 into engagement with valve seat 44 and thereby closes passage 36. Conversely, when the bellows is compressed, a compression force or pressure is set up within the bellows and against its fluid contents. The result is to seat ball 26 against valve seat 24, thereby closing passage 22, and to unseat ball 42 from valve seat 44, thereby opening passage 36. In the first case, where a suction force is set up, material 18 is drawn from the reservoir into the bellows and in the second case, when the compression force is set up, said material 18 is expelled from the bellows and introduced through tube 46 into a washing machine or other equipment, apparatus or receptacle for which said material is intended.

The means for operating the bellows as above described is solenoid 50 consisting of a coil 52 and a core or plunger 54. The coil 52 is mounted on a flanged sleeve 56 which is rigidly supported in axial alignment with the bellows by means of frame members 58 and 60. These frame members are themselves supported on frame 14. Sleeve 56 not only supports the coil 52 but it also serves as a bushing or bearing for the plunger 54. Fig. 1 shows the plunger in its inactive position, the solenoid being deenergized. This is its lower position. When the solenoid is energized, the plunger moves upwardly from its Fig. 1 position through sleeve 56. It is this upward movement that produces the compressive force in the bellows above mentioned.

It will now be observed that a thrust rod 62 is secured at its lower end to plunger 54 and the upper end of said rod is secured to a plate 64. The exact manner in which said thrust rod is secured to the plunger and to the plate is not critical. The bottom wall 34a of the bellows rests on plate 64 and is secured thereto by a suitable cement or adhesive or any other suitable means. Since rod 62 is secured to the plunger, it moves integrally therewith and when the plunger moves upwardly upon energization of the solenoid, so does the rod and the bellows is thereby compressed to expel its contents. When the solenoid is de-energized, the plunger and rod 62 fall of their own weight and draw the bellows into open or expanded condition. This produces a flow of material 18 from the reservoir and into the bellows, preparatory to the succeeding step in which the bellows is compressed and said material is dispensed.

The range of movement or the length of the stroke of plunger 54 will determine the extent to which the bellows will open and this, of course, will determine its capacity. The length of the stroke of the plunger is controlled by means of an adjusting or limiting screw 70. The upper end of said screw is secured to the lower end of the plunger, co-axially therewith. The screw projects downwardly through an opening 72 in base plate 12 of the apparatus. There is a nut 74 on said screw above said base plate and it will be observed that said nut serves as a stop member to prevent downward movement of screw 70 below a predetermined point. The limit of movement of the screw may be changed by simply changing the position of said nut 74 on said screw. When the nut is turned in one direction, the stroke of the plunger will be shortened since the range of movement of screw 70 will be reduced. When the nut is turned in the opposite direction, the length of the stroke of said plunger will be extended since the range of movement of screw 70 will be increased.

The lowermost end of screw 70 is provided with a head 76 and a coiled compression spring 78 is mounted on said screw between said head and plate or base 12. This spring operates to urge the screw 70 downwardly and thereby to urge the plunger 54 downwardly together with rod 62. This has the effect of opening the bellows and to provide the necessary suction force to draw some of the material 18 into the bellows against the action of spring-urged ball 26. The action of spring 78 is in addition to the pull of gravity upon said plunger as above described.

The foregoing is illustrative of a preferred form of this invention and it will be understood that this preferred form may be modified and other forms may be provided within the broad spirit of the invention and the broad scope of the claims.

A modified construction is shown in Fig. 2 wherein bellows 80 is secured to a support 82 which is attached to the plunger of solenoid 84. A nut 86 on said support 82 clamps the bottom wall of the bellows between washers 88 and 90 and secures said washers and said bottom wall of the bellows to said support 82. Disposed within the bellows is a compression spring 92 and it will be observed that one end bears against washer 88 and the other against the housing to which the bellows is secured. Valves 94 and 96 are disposed within said housing, much the same as the two valves shown and described in connection with the first form of this invention.

A hollow screw 98 may be screwed into the inlet passage which valve 94 controls. It will be observed that the head of this screw clamps the wall 100 of the reservoir to the housing and leakage is thereby prevented between the abutting walls of the reservoir and housing.

It will be observed from the foregoing that the principles of this invention may be applied in different ways without departing from the basic essentials of the invention as herein claimed.

I claim:

1. A dispensing mechanism for dispensing measured quantities of flowable material, comprising an elevated reservoir for such material, a bellows situated below said reservoir, a passage between said reservoir and said bellows through which said material may flow by gravity from the reservoir into the bellows, a valve in said passage, a second passage connected to said bellows through which the material received by the bellows may be ejected therefrom, a second valve in said second passage, a solenoid situated below the bellows, said solenoid having a coil which is fixed relative to the reservoir and a vertically movable plunger, and means connecting said plunger to said bellows, said plunger being movable upwardly when the solenoid is energized to compress the bellows and eject its contents through the second passage, said plunger being movable downwardly when the solenoid is deenergized to expand the bellows and thereby to fill it with material from the reservoir drawn through the first passage, said first valve being a normally closed valve which is adapted to open under the suction produced when the bellows is expanded to open position, the second valve being a normally closed valve which is adapted to open under the pressure produced when the bellows is compressed to closed position, and metering means being provided to control the flow of material from the reservoir to the bellows and then out of the bellows, said metering means comprising an adjustable travel-limiting device which is connected to the plunger and is vertically movable therewith, said travel-limiting device comprising a screw which is secured at one end to said plunger, the opposite end of the screw extending through a frame which is fixed relative to the solenoid coil, and a nut on said screw which is adjustably engageable with said frame to limit the downward movement of said screw relative to said frame and of said plunger relative to said coil, thereby limiting the expansion stroke of the bellows and controlling its intake of material from the reservoir.

2. A dispensing mechanism in accordance with claim 1, wherein said opposite end of said screw is provided with a head and a coiled compression spring is mounted on said screw, one end bearing against said head and the other end bearing against said fixed frame, the action of said coiled spring being to urge the plunger into inactive position when the solenoid is de-energized and thereby to expand the bellows.

3. A dispensing mechanism in accordance with claim 1 wherein a compression spring is disposed within the bellows, one end of the spring bearing against one end of the bellows and urging the bellows into open, expanded condition, thereby providing a suction force to draw material into the bellows from the reservoir.

References Cited in the file of this patent

UNITED STATES PATENTS

| | | |
|---|---|---|
| 1,404,152 | Kettering | Jan. 17, 1922 |
| 1,534,829 | Behnke | Apr. 21, 1925 |
| 2,585,172 | Reynolds | Feb. 12, 1952 |

FOREIGN PATENTS

| | | |
|---|---|---|
| 118,228 | Australia | Mar. 16, 1944 |
| 672,190 | Great Britain | May 14, 1952 |
| 718,971 | Germany | Mar. 25, 1952 |